(12) United States Patent
Collet et al.

(10) Patent No.: US 10,549,629 B2
(45) Date of Patent: Feb. 4, 2020

(54) METHOD FOR CONTROLLING DEPRESSURISATION IN A MOTOR VEHICLE FUEL TANK

(71) Applicants: CONTINENTAL AUTOMOTIVE FRANCE, Toulouse (FR); CONTINENTAL AUTOMOTIVE GMBH, Hannover (DE); AUDI AG, Ingolstadt (DE)

(72) Inventors: Thierry Collet, Fontenilles (FR); Oliver Grunwald, Buxheim (DE); Aurélien Groussard, Toulouse (FR)

(73) Assignees: CONTINENTAL AUTOMOTIVE FRANCE, Toulouse (FR); CONTINENTAL AUTOMOTIVE GMBH, Hannover (DE); AUDI AG, Ingolstadt (DE)

( * ) Notice: Subject to any disclaimer, the term of this patent is extended or adjusted under 35 U.S.C. 154(b) by 56 days.

(21) Appl. No.: 16/060,355

(22) PCT Filed: Dec. 5, 2016

(86) PCT No.: PCT/FR2016/053214
§ 371 (c)(1),
(2) Date: Jun. 7, 2018

(87) PCT Pub. No.: WO2017/098126
PCT Pub. Date: Jun. 15, 2017

(65) Prior Publication Data
US 2019/0001811 A1    Jan. 3, 2019

(30) Foreign Application Priority Data
Dec. 7, 2015  (FR) .................................. 15 61946

(51) Int. Cl.
*B60K 15/035*     (2006.01)
*B60K 15/03*      (2006.01)

(52) U.S. Cl.
CPC ................... *B60K 15/03519* (2013.01); *B60K 2015/03302* (2013.01); *B60K 2015/03514* (2013.01);
(Continued)

(58) Field of Classification Search
USPC ...................................................... 137/624.18
See application file for complete search history.

(56) References Cited

U.S. PATENT DOCUMENTS 4,872,439 A * 10/1989 Sonoda ............ B60K 15/03504
                                                      123/519
5,692,480 A * 12/1997 Kato ................ B60K 15/03504
                                                      123/519
(Continued)

FOREIGN PATENT DOCUMENTS

DE    10 2011 015999 A1    10/2012

OTHER PUBLICATIONS

International Search Report, dated May 16, 2017, from corresponding PCT application No. PCT/FR2016/053214.

*Primary Examiner* — Umashankar Venkatesan
(74) *Attorney, Agent, or Firm* — Young & Thompson

(57) ABSTRACT

Disclosed is a method for controlling depressurization in a fuel tank of a motor vehicle, including: the initial controlled opening of the isolation valve in order to lower the pressure inside the tank; determination of a blockage condition in the roll over valve on the basis of at least one item of information relating to the pressure gradient in the tank following the initial opening of the isolation valve; and, if the roll over valve blockage condition is met, the controlled closing of the
(Continued)

isolation valve, followed by its controlled re-opening in order to continue lowering the pressure in the tank.

8 Claims, 2 Drawing Sheets

(52) U.S. Cl.
CPC ............... *B60K 2015/03576* (2013.01); *Y10T 137/86445* (2015.04)

(56) References Cited

U.S. PATENT DOCUMENTS

| | | | | |
|---|---|---|---|---|
| 5,816,287 | A * | 10/1998 | Hyodo | B60K 15/03519 |
| | | | | 137/587 |
| 10,301,166 | B2 * | 5/2019 | Dudar | B67D 7/049 |
| 2011/0284125 | A1 * | 11/2011 | Hagen | B60K 15/03519 |
| | | | | 141/45 |
| 2015/0378368 | A1 * | 12/2015 | Haufler | F02M 25/0836 |
| | | | | 700/282 |
| 2016/0144711 | A1 * | 5/2016 | Criel | B60K 15/03504 |
| | | | | 137/14 |
| 2016/0265480 | A1 * | 9/2016 | Fukui | F02M 25/0809 |
| 2017/0234270 | A1 * | 8/2017 | Tochihara | B01D 53/0454 |
| | | | | 123/519 |
| 2018/0050587 | A1 * | 2/2018 | Qin | B60K 15/05 |
| 2018/0170173 | A1 * | 6/2018 | Grunwald | B60K 15/035 |
| 2019/0168607 | A1 * | 6/2019 | Thebault | F16K 15/026 |

\* cited by examiner

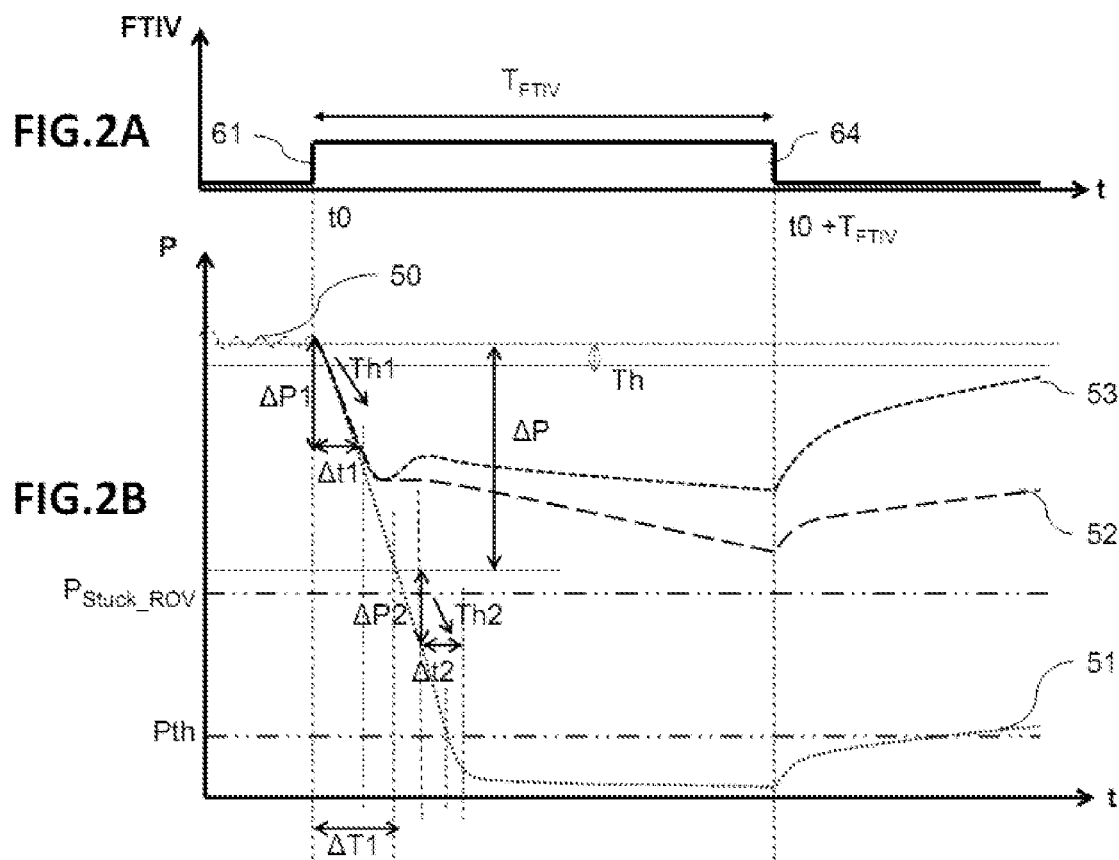
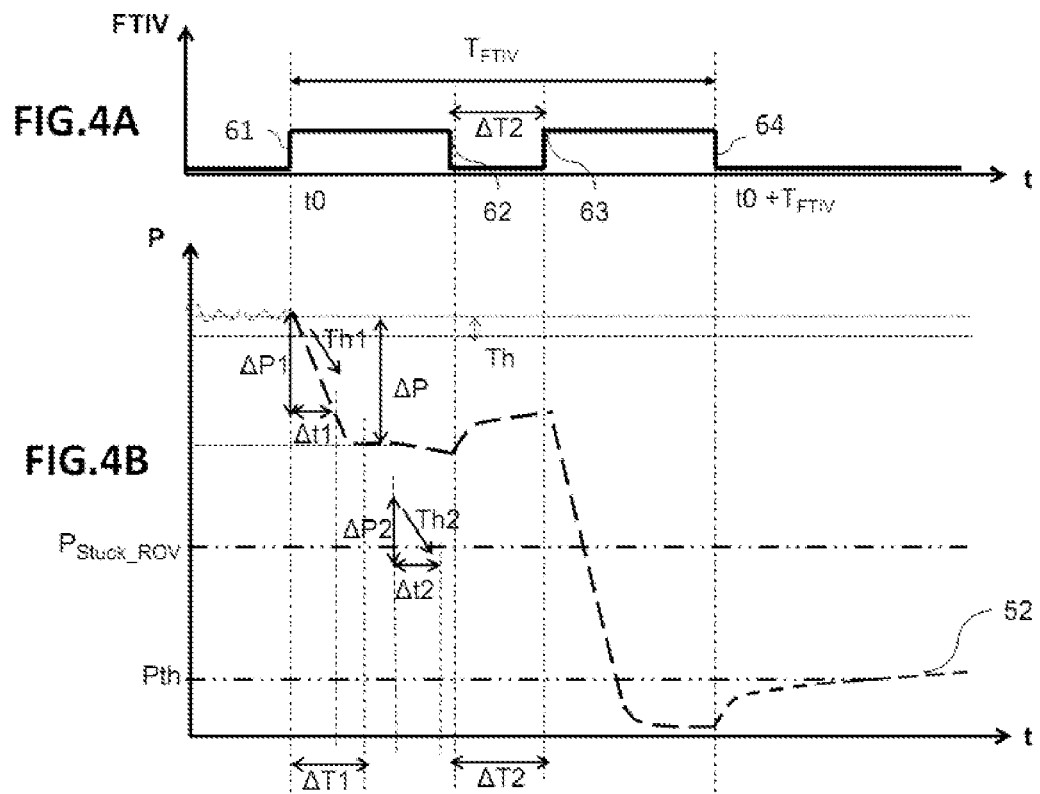

METHOD FOR CONTROLLING DEPRESSURISATION IN A MOTOR VEHICLE FUEL TANK

FIELD OF THE INVENTION

The present invention relates generally to the field of motor control for motor vehicles, and more particularly concerns a method and computer for controlling the depressurization of a fuel tank of a motor vehicle.

The invention has applications, in particular, in the fuel vapour exhaust system of motor vehicles with an internal combustion engine.

STATE OF THE ART

Nowadays, it is common to equip motor vehicle internal combustion engine fuel tanks, in particular motor vehicle gasoline engines, with fuel vapour exhaust systems.

As is known, a fuel vapour exhaust system connects the fuel tank to a fuel vapour filter (also referred to as a "canister"), generally an active carbon filter, which captures fuel vapours.

This fuel vapour filter is further connected to an air outlet and a purge system which feeds the captured fuel vapour into the engine, via a purge valve.

In the particular case of motor vehicles equipped with thermal/electric hybrid engines or thermal engines controlled by an ignition control method called "start-stop", operating time of the engine is reduced and may be insufficient for purging fuel vapour stored in the filter.

For this purpose, it is known to place an isolation valve (also known as "fuel tank isolation valve" or 'FTIV') in the fuel vapour exhaust system. This isolation valve is, for example, controlled to allow exhaust of fuel vapour when the engine is running, and block fuel vapours inside the tank when the engine is stopped. The tank must be designed to withstand a higher pressure than in motor vehicles having no such isolation valve.

However, it is necessary to monitor the pressure within the tank to ensure that the maximum pressure withstandable by said tank is never exceeded. It is also necessary to monitor the pressure inside the tank prior to filling in order to bring this pressure to ambient pressure prior to opening of the filling tank flap. In this case, the decrease in pressure must also be fast, to prevent the driver from having to wait too long to open said flap.

The fuel vapour exhaust system also includes a rollover valve (ROV). The rollover valve is intended to prevent fuel from escaping from the tank when the motor vehicle overturns, for example in the event of an accident. Thus, the rollover valve automatically closes when the motor vehicle overturns.

A disadvantage is that, when it triggers the opening of the isolation valve to quickly reduce the pressure within the tank before filling, the rollover valve may close in response to a major fuel vapour flow. However, once closed, the rollover valve takes a considerable time to open, during which time the exhaust system thus also remains closed, thus increasing the time required to bring the pressure inside the tank to the ambient pressure. The user may therefore have to wait a relatively long time before being able to fill the tank.

It is known from DE 10 2011 015999 which relates to a depressurization control method of a fuel tank of a motor vehicle, said motor vehicle comprising a fuel vapour exhaust system connecting the tank to a fuel vapour filter, the exhaust system comprising a tank isolation valve, and a rollover valve, the pressure within the tank being controlled by triggering the isolation valve. Advantageously, the method comprises the steps of:

triggering the initial opening of the isolation valve in order to reduce the pressure inside the tank;

determining a rollover valve blocking condition based on at least information relating to the gradient of the pressure in the tank after the initial opening of the isolation valve; and if the condition of blocking the rollover valve is met, triggering the closing of the isolation valve, and then triggering the reopening of the same in order to further decrease the pressure in the tank.

A momentary closure of the isolation valve before reopening of same allows, due to vapour leakage through the closed rollover valve, for rebalancing of the pressure on either side of the valve, which leads to the release and reopening thereof. When the isolation valve is reopened, the depressurization of the tank may then resume. Overall, the time required for depressurizing the tank can be reduced significantly in the event of accidental closing of the rollover valve. The specifications can even be met according to which said depressurization must occur before a fixed period, for example 10 seconds elapsed after the initial opening of the isolation valve. According to this, an absolute variation of expected change is sought over a long enough time that corresponds to the response of the system, i.e. several seconds. Then the absolute variation expected pressure is compared with a map (calibration) that covers all systems including dispersions, manufacturing tolerances . . . . The depressurization time depends ultimately on a delicate calibration covering the worst case, and is therefore not streamlined.

DISCLOSURE OF THE INVENTION

The present invention proposes to optimize the detection time of a blocking of the rollover valve by offering a generic solution that fits every vehicle in all environmental conditions and therefore have a faster reaction to release the pressure. With respect to the scope as defined above in relation to DE 10 2011 015999, the present invention is characterized in that the condition of blockage of the rollover valve is determined on the basis of information relating to the gradient of the pressure in the tank which is evaluated on the basis of values of the pressure in the tank detected after a first predetermined time has elapsed following the initial opening of the isolation valve, and in that the method according to the invention further comprises the following steps:

determining a blockage condition of the isolation valve as compared to a predetermined threshold of a drop in pressure in the tank for a specified period following the initial opening of the isolation valve; and if the blockage condition of the isolation valve is met, information is generated indicating a blockage condition of the isolation valve is met, executing the steps of the method of triggering the depressurization of the tank fuel being conditioned to determining that said isolation valve blockage condition is not met.

This time delay corresponding to the first term makes it possible to expect that, possibly, an initial flow of material in the fuel vapour exhaust system has caused the closure of the isolation valve and therefore the judgment of the decrease in pressure in the tank. At the initial opening of the isolation valve, indeed, a depressurization occurs by which the pressure decreases substantially, and the closure of the rollover valve, if it occurs, occurs only after a flow of vapour generated by this depressurization has already been evacuated. This is why it is not useful, and even it could be misleading to consider the pressure measurement at the initial opening of the isolation valve. With additional steps, an isolation failure of the valve in which it would remain closed can be discriminated from inadvertent closing of the rollover valve and the process steps are implemented only in the event that the isolation valve is not considered to be blocked. The method according to the invention which makes it possible to discriminate a closure of the isolation valve from a closure of the rollover valve, thus makes it possible to more reliably detect a blockage of said rollover valve and rationalize this detection on the basis of the physics of the system and to optimize the time of depressurization of the tank by the application of a minimum time of detection of the rollover valve blockage. The first term corresponds to the time required to establish the maximum rate of depressurization before blocking the rollover valve when the isolation valve is open.

In another implementation mode, the determination of the rollover valve blockage condition is determined based on a first piece of information relating to the gradient of the pressure in the tank which is evaluated on the basis of values of pressure in the tank detected after a first predetermined time has elapsed following the initial opening of the isolation valve, and further on the basis of a second piece of information relating to the gradient of the pressure in the tank which is evaluated on the basis of values of the pressure in the tank detected before said predetermined time has elapsed following the initial opening of the isolation valve. Thus, the determination of the blockage condition of the rollover valve is performed on the basis of the first piece of information relative to the second piece of information. Therefore, the risk of false identification or fault determination of blocking the valve inherent in the inclusion of information evaluated absolutely is overcome.

In one example, if the blockage condition of the rollover valve is met, the isolating valve is kept closed during at least one second fixed period before being re-opened in order to further decrease the pressure in the tank. This implementation mode has the advantage of simplicity. But it can be accomplished via a different method. For example, a reopening condition of the isolation valve may be assessed, again, for example, on the basis of information relating to the gradient of the pressure in the tank.

In one embodiment, the method may further comprise the steps of:
  comparing the pressure inside the tank to a pressure threshold, the initial opening of the isolation valve; and
  if the blocking pressure threshold of the rollover valve is exceeded a first condition of existence of a risk of blocking the rollover valve is determined, executing the steps of the control method for the depressurization of the fuel tank according to any one of claims 1 to 5 being on the basis of said determining that said first condition of existence of a risk of blocking of the rollover valve is met.

In one embodiment, the method may further comprise the steps of:
  comparison of the fuel level within the tank at a given fuel level threshold, in the initial opening of the isolation valve; and,
  if the fuel level threshold is exceeded, determining that a second condition of a blocking risk of the rollover valve is met, the execution of the steps of the depressurization control method of the fuel tank being on the basis of said determination that said second condition of existence of a risk of blocking of the rollover valve is met.

These provisions make it possible to limit the realization of the process steps of the invention to situations where there is a risk of blocking the rollover valve. In other words, these steps are not performed if it can be objectively considered that they are not necessary. This promotes the economy and simplicity of operation of the engine control computer.

In all cases, the computer can trigger the closing of the isolation valve after the expiration of a specified period following the initial opening of the isolation valve, so that it will not remain in the open position.

In a second aspect, the invention also relates to an electronic computer for a motor vehicle, comprising means configured to trigger an isolation valve of a fuel tank of the motor vehicle equipped with an internal combustion engine according all stages of the method according to the first aspect.

A third and final aspect of the invention relates to a motor vehicle comprising an electronic computer according to the second aspect.

BRIEF DESCRIPTION OF DRAWINGS

Other features and advantages of the invention will appear from reading the following description. This is purely illustrative and should be read in conjunction with the accompanying drawings wherein:

FIG. 2A and FIG. 2B are graphs illustrating the change in the pressure in the fuel tank of a motor vehicle during the depressurization of the tank according to the prior art, in many possible cases, including in the event of blocking in the closed position of the rollover valve;

In these figures, the same references denote the same or analogous elements in all figures. For clarity, the elements shown are not to scale relative to each other, unless otherwise specified.

DETAILED DESCRIPTION OF EMBODIMENTS OF THE INVENTION

Nowadays, it is common to equip motor vehicle internal combustion engine fuel tanks, in particular motor vehicle gasoline engines, with fuel vapour exhaust systems.

As is known, a fuel vapour exhaust system connects the fuel tank to a fuel vapour filter (also referred to as a "canister"), generally an active carbon filter, which captures fuel vapours.

This fuel vapour filter is further connected to an air outlet and a purge system which feeds the captured fuel vapour into the engine, via a purge valve.

Figure 1:
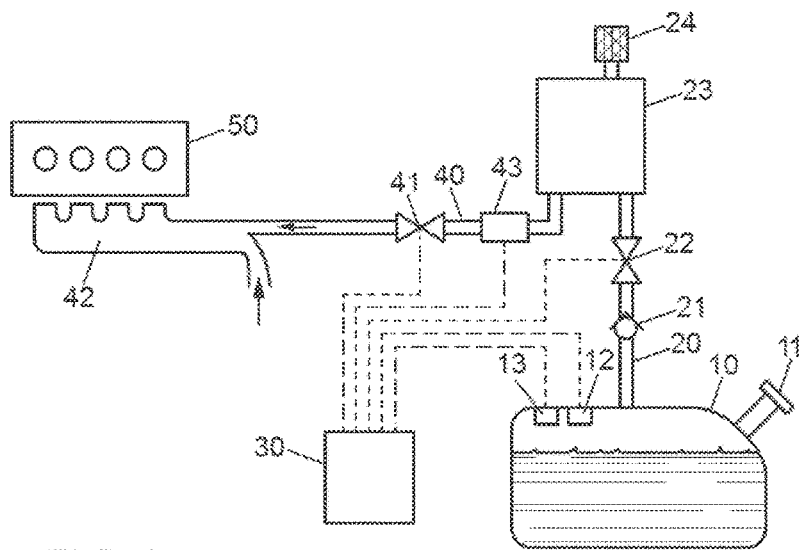
FIG. 1 is a schematic representation of a fuel vapour exhaust system of a tank of a motor vehicle.

FIG. 1 shows schematically an embodiment of a fuel vapour exhaust system 20, especially gasoline vapour, in a fuel tank 10 of a motor vehicle.

As illustrated by FIG. 1, the fuel vapour exhaust system 20 connects the tank 10 to a fuel vapour filter 23 ("canister"). The fuel vapour filter 23 also includes an air intake 24, so that the pressure at said filter 23 substantially corresponds to the ambient pressure, that is to say atmospheric pressure.

Between the tank 10 and the filter 23, the fuel vapour exhaust system 20 comprises a rollover valve 21 ("ROV") and an isolation valve 22 ("FTIV"). The rollover valve is provided to close the system 20 in the event of overturning of the vehicle when, for example, an accident occurs, to prevent the liquid fuel from flowing outside of the fuel tank 10. The fuel liquid is then confined in the tank 10, which reduces fire risk.

The isolation valve 22 is by default in a closed state in which no fuel vapour can flow from the tank 10 to the filter 23. Activation of the isolation valve 22 causes same to go from the closed state to an open state. When the isolation valve 22 is opened, fuel vapours escape from the fuel tank 10 towards the fuel vapour filter 23, due to the pressure difference between said tank 10 and said filter 23.

As illustrated by FIG. 1, the opening/closing of the isolation valve 22 for monitoring the pressure inside the fuel tank 10 is monitored by an electronic computer 30. The electronic computer 30 may for example be the engine management computer of the vehicle, or any other computer embedded in the vehicle, for example a computer dedicated to this function only, or dedicated to this function among others.

The electronic computer 30 includes for example at least one processor and at least one memory in which is stored a computer program. The program includes a set of program code instructions which, when executed by the processor, implement the steps of a method for triggering the isolation valve 22. Embodiments of the triggering process carried out by the program will be detailed below with reference to the step diagram of FIG. 3.

Alternatively, the electronic calculator 30 includes hardware such as one or more programmable logic circuits, such as FPGA, PLD, etc., and/or one or more specialized integrated circuits (ASIC) for implementing all or part of the steps of the method for triggering the isolation valve 22.

A combination of such hardware and one or more computer programs is also possible.

In other words, the electronic computer 30 includes a set of means configured to implement in software (computer program product specific) and/or hardware (FPGA, PLD, ASIC, etc.), the method for monitoring the pressure in the tank by triggering the isolation valve 22.

The fuel vapour filter 23 is also connected, in the example illustrated by FIG. 1, to an air intake manifold 42 of an engine 50 of the motor vehicle, by means of a purge circuit 40 on the fuel vapour filter 23. The purge circuit 40 includes in particular a purge valve 41 on the air intake manifold 42 side of the motor 50. The purge valve 41 is, for example, triggered by the electronic computer 30. When the purge valve 41 is closed, no fuel vapour flows between the fuel vapour filter 23 and the air intake manifold 42 of engine 50. When the purge valve 41 is opened, captured by the fuel vapour filter 23, fuel vapour can be purged in the direction of the air intake manifold 42 of the engine 50, which has pressure negative relative to ambient pressure at the air intake 24 of the fuel vapour filter 23.

The monitoring of the isolation valve 22 is particularly adapted to reduce the pressure of fuel vapour in the fuel tank 10 prior to the opening of a flap 11 of the container 10, for filling said tank 10 with fuel. To this end, the fuel tank 10 may be equipped with a pressure sensor 13, adapted to provide the electronic computer with information indicative of the pressure within said tank 10. The system is designed and controlled so that decreasing the pressure inside the tank 10 via the fuel vapour exhaust system 20 is relatively fast, to prevent the driver from waiting too long to actually open the flap 11. Nothing, however, precludes using the trigger method according to the invention for other fuel vapour pressure control operations inside the fuel tank 10, in particular to prevent this pressure from exceeding the pressure maximum withstandable by said fuel tank 10.

FIG. 2B illustrates the changes in pressure inside the fuel tank, over time, in response to the activation (i.e., closure) of the isolation valve for a time $T_{FTIV}$ as shown by the timing diagram of FIG. 2A.

At time t0, the computer triggers the activation of a signal denoted as 'FTIV' in FIG. 2A which goes from logic 0 (or low state) to logic 1 (or high). The rising edge 61 of this signal corresponds to the closing of the isolation valve 22 of FIG. 1. The 'FTIV' signal remains active for a fixed time, denoted $T_{FTIV}$ to FIG. 2A. For example, the time $T_{FTIV}$ may be equal to 10 seconds. This time is an average time considered sufficient to depressurize a standard motor vehicle tank. Other values, greater or lower, may be selected according to the specifics of the intended application, such as the capacity of the tank and the topology of the fuel vapour exhaust system.

At time $t0+T_{FTIV}$, the signal 'FTIV' returns to the low state. The falling edge 64 of this signal corresponds to the closing of the isolation valve 22 of FIG. 1.

Referring to FIG. 2B, before the time t0 the pressure in the tank is as shown by the curve portion 50. It is at a relatively high value, substantially corresponding to saturation in fuel vapours of the volume of free air above the amount of fuel contained in the tank. It slightly varies depending on various leaks that may arise from the tank and fuel supply circuits and exhausting of fuel vapour, in particular.

At the opening 61 of the isolation valve, the pressure decreases. FIG. 2B shows three different curves illustrating the change in the pressure in the tank in three respective cases, namely:

curve 51 corresponds to depressurization of the tank without closing the rollover valve ("ROV"), in the case of a standard type of fuel (PSI value of 7, for example) and a relatively low ambient temperature (e.g. below 20° C.) leading to a relatively low amount of generated vapour;

curve 52 corresponds to depressurization of the tank always in the case of a relatively small amount of generated vapours, but with an unwanted closure of the rollover valve, caused by a large flow of vapour therethrough to the opening of the isolation valve; and, the curve 53 corresponds to depressurization of the tank also with inadvertent closure of the rollover valve, but this time in the case of a winter fuel (PSI index 15, for example) and a relatively high ambient temperature (e.g. greater than 20° C.) leading to a relatively high amount of generated vapour.

In the case of curve 51, the pressure decreases regularly from the opening 61 of the isolation valve at the time t0, and falls below a threshold value Pth before the expiry of the time $T_{FTIV}$ and programmed closure 64 of the isolation valve at time $t0+T_{FTIV}$. This pressure threshold Pth is the threshold below which the opening of the fuel filler flap can be permitted. After the closure 64 of the isolation valve, the pressure in the tank rises because the fuel vapour can no longer be discharged through said valve.

In the case of curve 52, the pressure also decreases from the opening 61 of the isolation valve at the time t0. But soon after this time (for example, or after approximately a second or two) it stops decreasing just as quickly. It settles for a relatively short time (also on the order of one to two seconds, for example). Then it decreases regularly, but weakly, which does not allow it to fall below the threshold value Pth before the expiry of the time $T_{FTIV}$ and scheduled closure 64 of the isolation valve at time $t0+T_{FTIV}$. Stopping the rapid decrease in pressure is due to the inadvertent, i.e. unwanted, closure of the rollover valve which is caused by the major flow of vapour through the opening of the isolation valve. The small decrease in pressure that follows is due in turn to leaks at the rollover valve. After the closure 64 of the isolation valve, the pressure in the tank rises because the fuel vapour can no longer be discharged through said valve.

Last, the case of curve 53 is similar to that of curve 52, but with the following differences. When the rapid decrease of pressure ceases due to the inadvertent closure of the rollover valve, the pressure even tends to rise because the amount of fuel vapours produced is major, greater than the amount of vapour escaping from the tank when leaking through the closed valve. This is due also to fresh air inlet in the tank, which causes a peak in the generation of vapour. Then, the pressure having thus increased in the tank and the effect of generating a peak in vapour being passed (the volume of air in the tank being saturated with fuel vapour), the decrease in pressure in the tank is due to fuel vapour leakage through the isolation valve. This was still relatively lower than in the case of curve 52, always because the amount of produced fuel vapour is greater.

Figure 3:
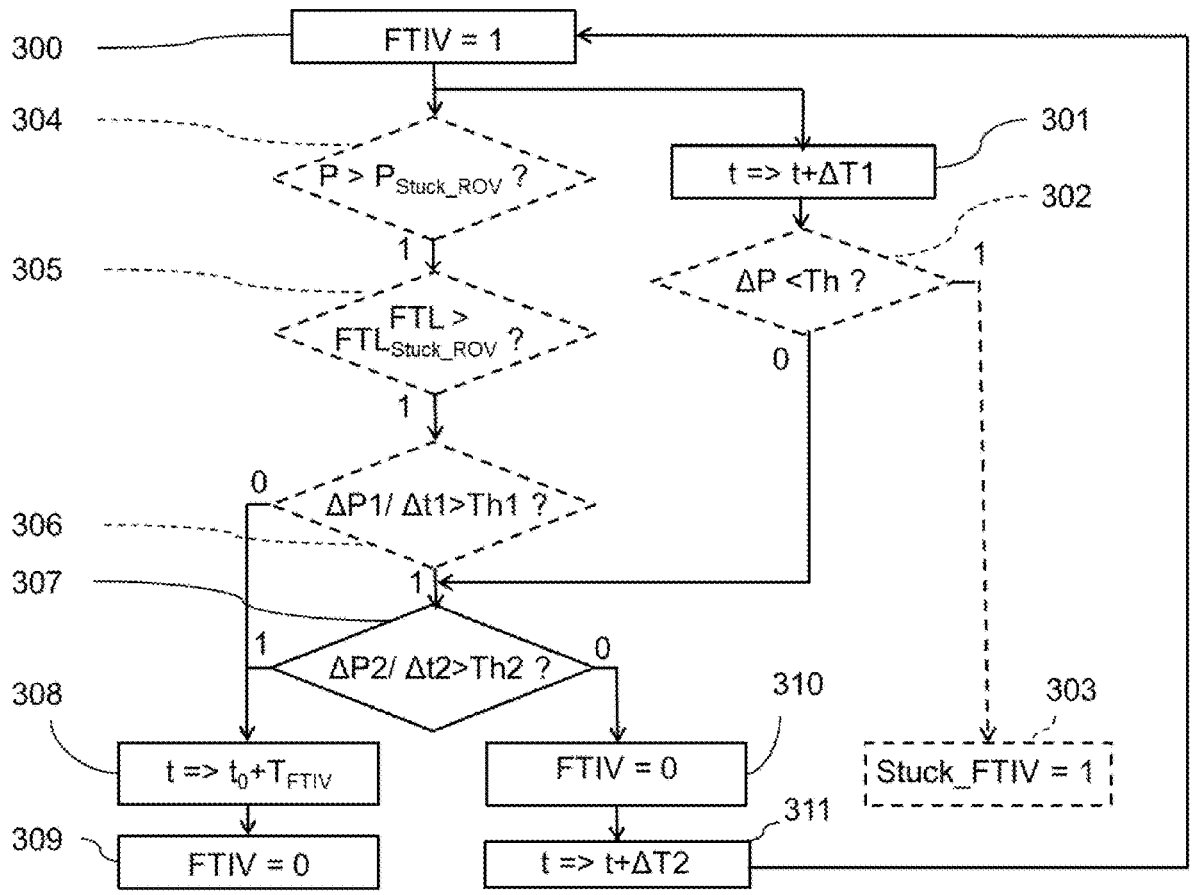
FIG. 3 is a step diagram illustrating the implementation modes of a depressurization control method of a tank according to the invention; and, FIG. 4B and FIG. 4B are graphs illustrating the changes of pressure in the tank during the implementation of the method of FIG. 3.

The main steps of modes of implementation of the fuel tank pressure control method will now be described with reference to the step diagram of FIG. 3, and to the timing diagrams of FIGS. 4A and 4B. These are compared to those of FIGS. 2A and 2B, respectively, which illustrate the prior art. The steps of the method of FIG. 3 are, for example, implemented as instructions of a computer program stored and executed in the electronic calculator 30 of FIG. 1.

At step 300, the program triggers the initial opening of the isolation valve, for example by passing the high logic level signal 'FTIV'. This is shown by the rising edge 61 of the 'FTIV' at time to, as shown in FIG. 4A. For example, step 300 may be triggered by the computer 30 in response to a user action for the opening of the filler flap 11 of the tank 10 (FIG. 1). This opening of the isolation valve is intended and has the effect of lowering the pressure within the tank; fuel vapour contained in the tank can then drain to the fuel vapour filter ("canister").

In principle, the opening of the isolation valve must last for the specified period of time $T_{FTIV}$, which is considered sufficient to remove any fuel vapours in the tank, and thus to allow for the opening of the filler flap. It will be disclosed, however, that the invention provides that it may be otherwise in the case of determining that a spurious blockage condition of the rollover valve is met.

At step 306, a first information $\Delta P1/\Delta t1$ on the gradient of the pressure in the tank can be assessed on the basis of values of the pressure in the tank that are detected before a first $\Delta T1$ determined time has elapsed following the initial opening 61 of the isolation valve. The information $\Delta P1/\Delta t1$ is representative of the drop in pressure in the tank. In other words, the $\Delta P1/\Delta t1$ gradient is negative. The absolute value (i.e., unsigned) of the gradient indicates the speed of the decrease of the pressure in the subsequent tank, i.e. immediately caused by the initial opening of the isolation valve. Plus the difference between the initial pressure in the tank and the ambient pressure prevailing in the exhaust system downstream of the vapour valve is important, more information $\Delta P1/\Delta t1$ is negative. For example, the values of the pressure in the tank detected to evaluate the $\Delta P1/\Delta t1$ gradient are raised from the time t0, during the reference period $\Delta t1$, e.g., a value detected at t0 and another value detected at $t0+\Delta t1$.

In one embodiment, if the information $\Delta P1/\Delta t1$ is not greater in absolute value (i.e., unsigned) to a threshold Th1 (which is also a negative value), it is determined that the gradient of the depressurization tank is too low for there to be a risk of accidental closing of the rollover valve. Indeed, the flow of fumes passing through the valve is then relatively low. Therefore, the valve can be kept open (signal 'FTIV' at the high logic state, or FTIV=1) for the time $T_{FTIV}$, before being closed (signal 'FTIV' at the logic low state, or FTIV=0). This is illustrated in the diagram of FIG. 3 by the steps 308 and 309, respectively. In other words, control of the isolating valve then proceeds as in the case of the prior art illustrated by FIG. 2A.

In the opposite case of the following cases, that is to say if the information $\Delta P1/\Delta t1$ is greater in absolute value than threshold Th1, then in step 307, a second information $\Delta P2/\Delta t2$ relative to the gradient the pressure in the tank is evaluated to determine if the blockage condition of the rollover valve is filled. Information $\Delta P2/\Delta t2$ is assessed on the basis of values of the pressure in the tank that are detected after the aforementioned determined time $\Delta T1$ has elapsed after the initial opening 61 of the isolation valve. This timing $\Delta T1$ is shown in FIG. 3 by step 301, which follows step 300 and precedes step 307.

At step 307, information $\Delta P2/\Delta t2$ is compared with a second threshold Th2 negative value. The threshold Th2 may be equal or lower in absolute value (i.e., unsigned), the first threshold Th1 hereinbefore.

If the information $\Delta P2/\Delta t2$ is greater in absolute value (i.e., unsigned) to the threshold Th2, it is determined that the closed condition of the rollover valve is not fulfilled. Stated otherwise, the persistence of a depressurization with a large negative gradient (i.e., beyond the threshold Th2 in absolute value) at the end of the $\Delta T1$ timing of the opening of the isolation valve, is interpreted as the maintaining a fuel vapour flow through the rollover valve. This means that said valve has not closed. Referring to the diagram of steps in FIG. 3, in this case step 307 is followed by step 308, then in step 309, steps that have already been presented hereinbefore.

In the opposite case, that is to say, when the information $\Delta P2/\Delta T2$ is not greater in absolute value (i.e., unsigned) to the threshold Th2, it is determined that the closed condition of the rollover valve is fulfilled. In other words, either the depressurization of the tank is interrupted if it continues but with a low negative gradient (i.e., below the threshold Th2 in absolute value) at the end of the timing $\Delta T1$ of the opening of the isolation valve. This is interpreted as a lack of a significant flow of fuel vapour through the rollover valve. This is then attributed to the fact that said valve is closed unintentionally consecutively opening the isolation valve. With reference to the steps in the FIG. 3 diagram, in this case, step 307 is followed by a step 310 in which the computer controls the closing of the isolation valve. 4A, this closing of the isolation valve is represented by the falling edge 62 of signal 'FTIV', which occurs before the expiration of the normal time $T_{FTIV}$ closing said valve.

Then the closure 62 of the isolation valve at step 310, the method includes maintaining 311 of the isolation valve closed during at least a second determined time $\Delta T2$ before being reopened to continue downward the pressure in the tank. The reopening of the isolation valve at the end of the time delay corresponding to the time $\Delta T2$ is represented by the rising edge 63 of signal 'FTIV' in FIG. 4A. With reference to the step diagram of FIG. 3, this reopening is symbolized by looping step 311 toward the step 300.

This reference is now made to curve 52 of FIG. 4B, which is the same case as that of curve 52 of FIG. 2B but this time with the implementation of the method of the invention, and in particular the sequence of steps 300, 307, 310 311, and then step 300 again followed by step 308 and finally step 309.

As seen in FIG. 4B, from the closure 62 of the isolation valve controlled in step 310 of FIG. 3, the pressure rises in the tank due to vaporization of the fuel and because the vapours thus generated cannot be discharged even in the low measurement that was permitted by leakage through the closed rollover valve. However, these leaks continue until balancing the pressure on either side of the rollover valve. The time of the timer ΔT2 is adapted so that this balance is reached before the expiration of said timer. It follows that the rollover valve opens again before the end of the timer ΔT2. Therefore, when the re-opening 63 of the isolation valve is controlled by the looping of the method to step 300, the pressure in the tank begins to decrease sharply, that is to say with a comparable negative gradient to that consecutively exist at the initial opening 61 of the isolation valve. Whereby the pressure may fall below the pressure threshold Pth before the expiry of the timer ΔT1 following the initial opening 61 of the isolation valve.

In other words, the comparison of curve 52 of FIG. 4B with that of FIG. 2B shows that, thanks to the invention, the depressurization of the tank can be achieved within the maximum time period defined by the timer ΔT1 even in case of accidental closing of the rollover valve caused by a large flow of fuel vapour to the initial opening of the isolation valve.

In the implementation of modes which have been described above, the determination of the turning of the valve blockage condition is determined in step 307 based on the information ΔP2/Δt2 on the gradient of the pressure in the tank which is evaluated on the basis of values of the pressure in the tank detected after the first determined time ΔT1 has elapsed after the initial opening 61 of the isolation valve.

In another implementation mode, in step 307, the blockage condition of the rollover valve is determined based on information ΔP2/Δt2 on the gradient of the pressure in the tank which is evaluated on the basic values of the pressure in the tank detected after the first determined time ΔT1 has elapsed following the initial opening 61 of the isolation valve, and on the further basis of the information ΔP1/Δt1 on the gradient the pressure in the tank which is evaluated on the basis of values of the pressure in the tank detected before said determined time ΔT1 has elapsed after the initial opening 61 of the isolation valve. For example, it is necessary that information ΔP1/Δt1 is greater than the first threshold Th1 and the information ΔP2/Δt2 is less than the second threshold Th2 for the blockage condition of the rollover valve is deemed to be met. This implementation mode is more robust than the previous one because it takes into account the dynamics of depressurization through a relative assessment of information ΔP2/Δt2 compared to information ΔP1/Δt1, while the embodiment in previous work includes only information ΔP2/Δt2 characterizing this absolute depressurization.

In another implementation mode, the method of FIG. 3 may further comprise a step 302 of determining a blockage condition of the isolation valve as compared with a determined threshold Th of a pressure drop ΔP in the tank, for example after the determined time ΔT1 has elapsed after the initial opening 61 of the isolation valve (or after any other term that would be considered preferred). The threshold Th is a negative threshold value. If the blockage condition of the isolation valve is met, that is to say if ΔP<Th, then the computer generates in step 303 a piece of Stuck_FTIV information indicative of the blockage of the isolation valve. For example a Stuck_FTIV parameter corresponding to the programs proceeds to logic value 1: Stuck_FTIV=1.

Said Stuck_FTIV information can then be taken into account in the sense, for example, that if Stuck_FTIV=1 then the process steps described so far are not implemented. Indeed, if the FTIV valve is blocked, the information regarding the gradient of the pressure in the tank is irrelevant to whether the rollover valve is blocked or not. It appears in fact to the skilled person that a failure of the isolation valve by which it would remain stuck closed can be confused with the untimely closure of the rollover valve. It is therefore useful to distinguish the two situations, which the Stuck_FTIV information makes possible.

Another implementation mode may further comprise a step 304 of comparing the pressure inside the tank at a determined pressure threshold $P_{Stuck\_ROV}$. This pressure can be evaluated at the initial opening 61 of the isolation valve. If the $P_{Stuck\_ROV}$ pressure threshold is exceeded, the computer proceeds to the next step. This means in effect that the tank pressure is very strong so that a risk of untimely blocking the rollover valve actually exists. Otherwise, the process steps described so far are useless and, preferably, are not executed. $P_{Stuck\_ROV}$ the threshold is shown in FIGS. 2B and 4B. It is for example equal to 100 mB.

Finally, another implementation mode may further include a step 305 of comparing the fuel level inside the tank to a predetermined threshold $FTL_{Stuck\_ROV}$ of fuel level. This step can be carried out at the initial opening 61 of the isolation valve. If the fuel level threshold $FTL_{Stuck\_ROV}$ is exceeded, the computer proceeds to the next step. This means in effect that the fuel level in the tank is very high and may affect the operation of the rollover valve and in particular cause the untimely closure thereof. Otherwise, the process steps described so far are useless and, preferably, are not executed.

The present invention has been described and illustrated in this detailed description and in the figures of the accompanying drawings. The present invention is not limited, however, to the embodiments as presented. Other variants and embodiments can be derived and implemented by the person skilled in the art reading this description and the appended drawings.

In the claims, the term "comprise" does not exclude other elements or other steps. A single processor or more units can be used to implement the invention. The various features disclosed and/or claimed may be advantageously combined. Their presence in the description or in different dependent claims does not exclude this possibility. Finally, reference signs to the figures of the drawings should not be construed as limiting the scope of the invention.

The invention claimed is:

1. A method (50) for controlling the depressurization of a container (10) of fuel of a motor vehicle, said motor vehicle comprising a fuel vapour exhaust system (20) connecting the tank (10) to a fuel vapour filter (23), the exhaust system (20) having an isolation valve (22) of the tank (10) and a rollover valve (21), the pressure inside the tank (10) being controlled by controlling the isolation valve (22), said method comprising the steps of:

commanding (300) the initial opening (61) of the isolation valve in order to reduce the pressure inside the tank;

determining (307) a blockage condition of the rollover valve based on at least information relating to the gradient of the pressure in the tank after the initial opening (61) of the isolation valve; and, if the blockage condition of the rollover valve is met, commanding (310) the closure (62) of the isolation valve, and controlling (300) re-opening (63) in order to further decrease the pressure in the tank, wherein determining the blockage condition of the rollover valve is determined on the basis of information ($\Delta P2/\Delta t2$) relative to the gradient of the pressure in the tank which is evaluated based on values of the pressure in the tank measured after a first determined time ($\Delta T1$) has elapsed after the initial opening (61) of the isolation valve, and wherein the method further comprises the following steps:

determining (302) a blockage condition of the isolation valve as compared to a given threshold (Th) lower than the pressure ($\Delta P$) in the tank for a specified period following the initial opening (61) of the isolation valve; and if the isolation valve blockage condition is met, generating (303) a piece of information (Stuck_FTIV) indicating that the isolation valve blockage condition is met, execution of the method steps of the depressurization of the fuel tank control being contingent on determining that said blockage condition of the isolation valve is not met.

2. A method of claim 1, wherein the determination of the blockage condition the rollover valve is determined on the basis of first information ($\Delta P2/\Delta t2$) on the gradient of the pressure in the tank which is evaluated on the basis of values of the pressure in the tank measured after a first determined time ($\Delta T1$) has elapsed after the initial opening (61) of the isolation valve, and on the basis further of a second information ($\Delta P1/\Delta t1$) on the gradient of the pressure in the tank which is evaluated on the basis of values of the pressure in the tank measured before said determined time ($\Delta T1$) has elapsed after the initial opening (61) of the isolation valve.

3. A method according to claim 1, wherein if the blackage condition the rollover valve is met, the isolating valve is kept closed during at least a second determined time ($\Delta T2$) before being reopened (63) in order to further decrease the pressure in the tank.

4. A method according to claim 1, further comprising a step of:

comparing (304) the pressure within the tank with a determined pressure threshold (PStuck_ROV) at the initial opening (61) of the isolation valve; and if the rollover valve blocking pressure threshold is exceeded, determination that a first condition of existence of a risk of blocking the rollover valve is met, the execution of the steps of the method for controlling depressurization of the fuel tank according to claim 1 being conditioned to said determination that said first condition of existence of a risk of blocking of the rollover valve is met.

5. A method according to claim 1, further comprising a step of:

comparing (305) the fuel level inside the tank with a predetermined fuel level threshold ($FTL_{Stuck\_ROV}$), to the initial opening (61) of the isolation valve; and, if the fuel level threshold is exceeded, determining that a second condition of existence of a risk of blocking the rollover valve is met, the execution of the steps of the depressurization control method of the fuel tank according to claim 1 being contingent on said determination that said second condition of existence of a risk of blocking of the rollover valve is met.

6. A method according claim 1, comprising the closure (309, 64) of the isolation valve after the expiration (308) of a fixed time ($T_{FTIV}$) after initial opening (61) of the isolation valve.

7. A motor vehicle electronic calculator (30), configured to control an isolation valve (22) of a fuel tank (10) of a motor vehicle equipped with an internal combustion engine (50) according to a method according to claim 1.

8. A motor vehicle comprising an electronic computer (30) according to claim 7.

\* \* \* \* \*